US010596762B2

(12) United States Patent
Sauer et al.

(10) Patent No.: US 10,596,762 B2
(45) Date of Patent: Mar. 24, 2020

(54) ADDITIVELY MANUFACTURED COMPONENTS INCLUDING CHANNELS

(71) Applicants: Rolls-Royce Corporation, Indianapolis, IN (US); Rolls-Royce PLC, London (GB)

(72) Inventors: Kevin Sauer, Plainfield, IN (US); John Holdcraft, Carmel, IN (US); David Stapleton, Leicester (GB)

(73) Assignees: Rolls-Royce Corporation, Indianapolis, IN (US); Rolls-Royce PLC, London (GB)

( * ) Notice: Subject to any disclaimer, the term of this patent is extended or adjusted under 35 U.S.C. 154(b) by 305 days.

(21) Appl. No.: 15/449,212

(22) Filed: Mar. 3, 2017

(65) Prior Publication Data

US 2017/0315538 A1     Nov. 2, 2017

Related U.S. Application Data

(60) Provisional application No. 62/329,038, filed on Apr. 28, 2016.

(51) Int. Cl.
  *B29C 64/393*     (2017.01)
  *B29C 64/386*     (2017.01)
  (Continued)

(52) U.S. Cl.
  CPC .......... *B29C 64/393* (2017.08); *B29C 64/153* (2017.08); *B29C 64/386* (2017.08);
  (Continued)

(58) Field of Classification Search
  None
  See application file for complete search history.

(56) References Cited

U.S. PATENT DOCUMENTS 5,952,018 A     9/1999 Beldue et al.
9,849,510 B2 *  12/2017 Lacy .................. B23K 15/0086
(Continued)

FOREIGN PATENT DOCUMENTS

EP     2910324         8/2015
WO     2013160198 A1   10/2013

OTHER PUBLICATIONS

Thingiverse—Parametic teardrop script, Jun. 30, 2010, Retrieved from https://www.thingiverse.com/thing:3457/files (Year: 2010).*

(Continued)

*Primary Examiner* — Benjamin A Schiffman
(74) *Attorney, Agent, or Firm* — Shumaker & Sieffert, P.A.

(57) ABSTRACT

An example system may include a computing device and an additive manufacturing tool. The computing device may define a digital representation of an inclined channel at least partially within a component, including an angle θ based on a formula $\theta = 2 \tan^{-1} [\tan(\lambda/2)/\sin(\alpha)]$. The inclined channel may define a longitudinal axis inclined at the angle α relative to a build direction, and may include a gabled roof configured to collapse into an arched roof. The angle λ is a predetermined interior angle of the gabled roof measured in a plane substantially parallel to the build direction. The angle θ is an interior angle of the gabled roof in a plane substantially normal to the inclined longitudinal axis. The computing device may control, based on the digital representation, the additive manufacturing tool to deposit a material along the build direction to fabricate the component including the inclined channel.

7 Claims, 7 Drawing Sheets

(51) Int. Cl.
 B29C 64/153 (2017.01)
 B33Y 10/00 (2015.01)
 B33Y 30/00 (2015.01)
 B33Y 50/02 (2015.01)
 B33Y 80/00 (2015.01)
 G05B 19/4099 (2006.01)
 G05B 19/4097 (2006.01)

(52) U.S. Cl.
 CPC ............... *B33Y 10/00* (2014.12); *B33Y 30/00* (2014.12); *B33Y 50/02* (2014.12); *B33Y 80/00* (2014.12); *G05B 19/4097* (2013.01); *G05B 19/4099* (2013.01); *G05B 2219/49007* (2013.01)

(56) References Cited

U.S. PATENT DOCUMENTS

2014/0251481 A1 9/2014 Kroll et al.
2015/0104326 A1 4/2015 Waldman et al.
2016/0303656 A1* 10/2016 Lacy ................. B23K 15/0086

OTHER PUBLICATIONS

RepRapLogo-RepRapWiki, Nov. 13, 2013, Retrieved from http://reprap.org/wiki/RepRapLogo, 2 pgs.
Optimize Designs for Better 3D Printing-Engineering.com, Dec. 17, 2012, Retrieved from http://www.engineering.com/3DPrinting/3DPrintingArticles/ArticleID/5070/Optimize-Designs-for-Better-3D-Printing.aspx, 6 pgs.
3D Alchemy, DMLS/SLM Metal 3D Printing, An introductory design guide for our 3d printing in metal service, Mar. 14, 2016, Retrieved from https://www.3d-alchemy.co.uk/assets/datasheets/3d_alchemy_DMLS_Metal_Design_Guide.pdf, 11 pgs.
Designing for 3D printing-3D Verkstan Knowledge Base, Jan. 29, 2015, Retrieved from http://support.3dverkstan.se/article/38-designing-for-3d-printing, 20 pgs.
Dimensional Accuracy and Surface Finish in Additive Manufacturing, Proceedings of ASPE 2014 Spring Topical Meeting, Apr. 13-16, 2014, Retrieved from http://aspe.net/publications/spring_2014/2014%20aspe%20spring%20proceedings-print%20final.pdf, 244 pgs.
Hissam et al., "Additive Manufacturing Design Considerations for Liquid Engine Components", NASA, Sep. 4, 2014, Retrieved from http://ntrs.nasa.gov/archive/nasa/casi.ntrs.nasa.gov/20140016675.pdf, 21 pgs.
Getting better prints-3D Verkstan Knowledge Base, Retrievd on Jan. 11, 2017 from http://support.3dverkstan.se/article/30-getting-better-prints, 25 pgs.
[replicator 5th gen] Can you print horizontal holes? 3D printing, Mar. 12, 2015, Retrieved from https://www.reddit.com/r/3Dprinting/comments/2yqxo7/replicator_5th_gen_can_you_print_horizontal_holes/, 3 pgs.
Flat Teardrop-Pleasant Hardware, Nov. 29, 2011, Retrieved from http://pleasantsoftware.com/developer/3d/2011/11/29/flat-teardrop/, 7 pgs.
Tear Drop Holes, Retrieved on Jan. 11, 2017 from http://forums.reprap.org/read.php?1,45950,45951, 3 pgs.
Ultimaker-Can't get round circles, Dec. 16, 2013, Retrieved from https://ultimaker.com/en/community/4732-cant-get-round-circles, 10 pgs.
Thingiverse—Parametic teardrop script, Jun. 30, 2010, Retrieved from http://www.thingiverse.com/thing:3457, 2 pgs.
Response to Extended Search Report dated Sep. 22, 2017, and Communication Pursuant to Rule 69 EPC dated Nov. 6, 2017, from counterpart European Application No. 17165567.3, filed Apr. 27, 2018, 8 pp.
Communication Pursuant to Rule 69 EPC dated Nov. 6, 2017, from counterpart European Application No. 17165567.3, 2 pp.
Reiss, "Complex Processes and 3D Printing," Imperial College London, BSc Project, Jun. 10, 2013, 23 pp.
Huang et al., "Statistical Predictive Modeling and Compensation of Geometric Deviations of Three-Dimensional Printed Products," Journal of Manufacturing Science and Engineering, vol. 136, Dec. 2014, 10 pp.
Extended Search Report from counterpart European Application No. 17165567.3, dated Sep. 22, 2017, 8 pp.

* cited by examiner

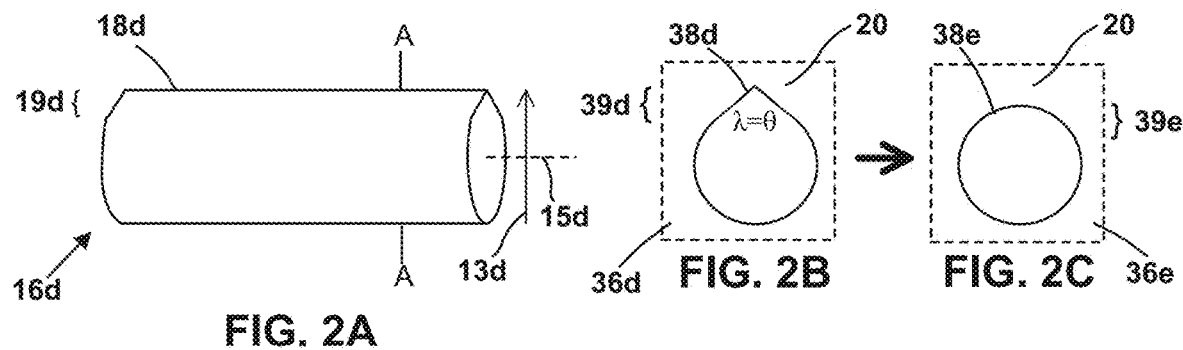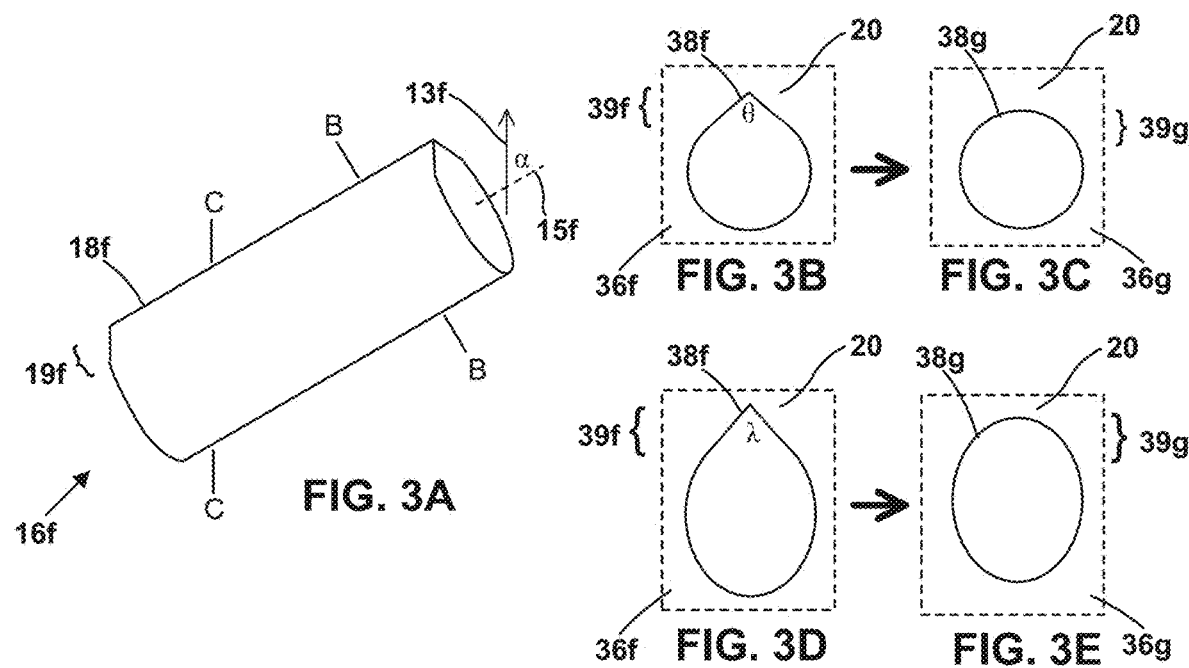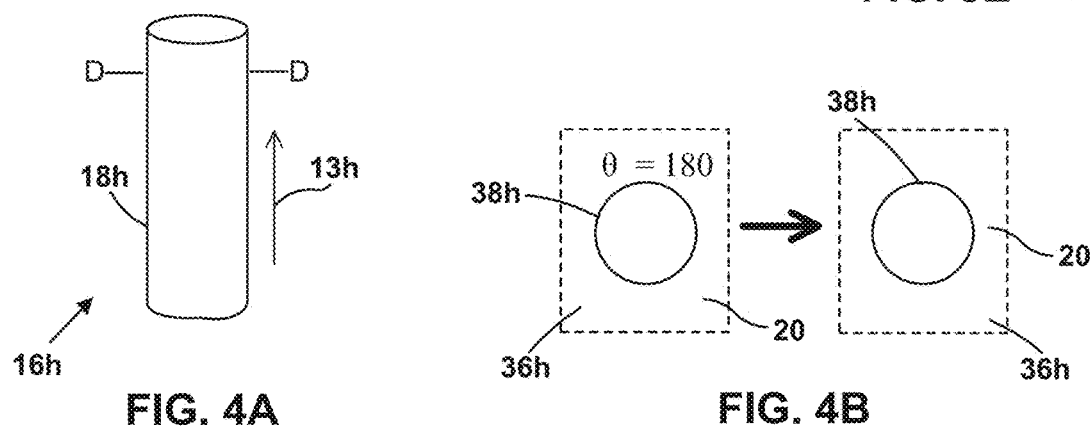

```
┌─────────────────────────────────────────────────────────────┐
│      DEFINE A DIGITAL REPRESENTATION OF AN INCLINED CHANNEL AT │
│      LEAST PARTIALLY WITHIN A COMPONENT, INCLUDING AN ANGLE θ │
│      BASED ON A FORMULA θ = 2 tan⁻¹ [tan(λ/2)/sin(α)], WHEREIN THE │
│      INCLINED CHANNEL DEFINES A LONGITUDINAL AXIS INCLINED AT THE │
│      ANGLE α RELATIVE TO A BUILD DIRECTION OF THE COMPONENT, │
│ 40   WHEREIN THE DIGITAL REPRESENTATION OF THE INCLINED CHANNEL │
│      INCLUDES A GABLED ROOF CONFIGURED TO COLLAPSE INTO AN │
│      ARCHED ROOF, WHEREIN THE ANGLE α IS A PREDETERMINED │
│      INTERIOR ANGLE OF THE GABLED ROOF MEASURED IN A PLANE │
│      SUBSTANTIALLY PARALLEL TO THE BUILD DIRECTION, WHEREIN THE │
│      ANGLE θ IS AN INTERIOR ANGLE OF THE GABLED ROOF IN A PLANE │
│      SUBSTANTIALLY NORMAL TO THE INCLINED LONGITUDINAL AXIS │
└─────────────────────────────────────────────────────────────┘
```

Define a digital representation of an inclined channel at least partially within a component, including an angle $\theta$ based on a formula $\theta = 2 \tan^{-1}[\tan(\lambda/2)/\sin(\alpha)]$, wherein the inclined channel defines a longitudinal axis inclined at the angle $\alpha$ relative to a build direction of the component, wherein the digital representation of the inclined channel includes a gabled roof configured to collapse into an arched roof, wherein the angle $\alpha$ is a predetermined interior angle of the gabled roof measured in a plane substantially parallel to the build direction, wherein the angle $\theta$ is an interior angle of the gabled roof in a plane substantially normal to the inclined longitudinal axis — 40

Control, based on the digital representation, an additive manufacturing tool to deposit the material along the build direction to fabricate the component including the inclined channel — 46

Allow the controlled-collapse gabled roof of the inclined channel to collapse to form an inclined arched roof — 48

FIG. 5

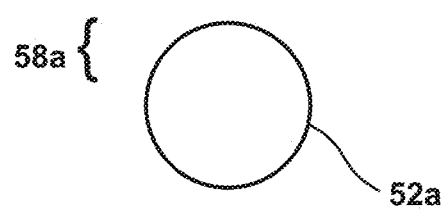
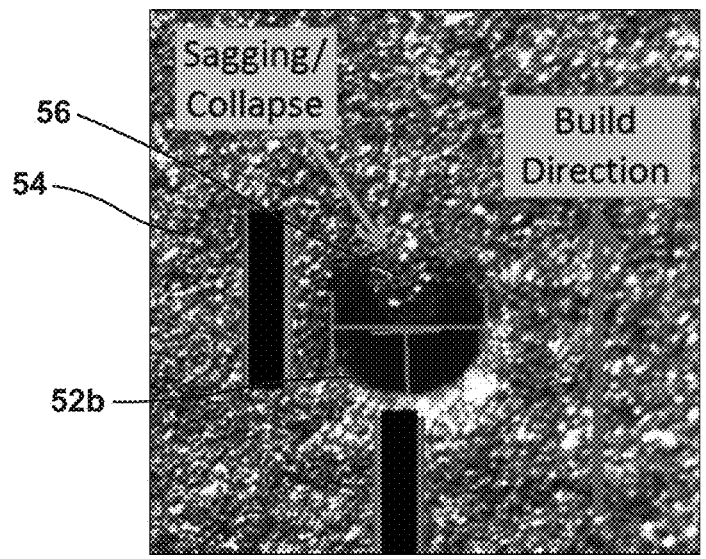
FIG. 6A  FIG. 6B
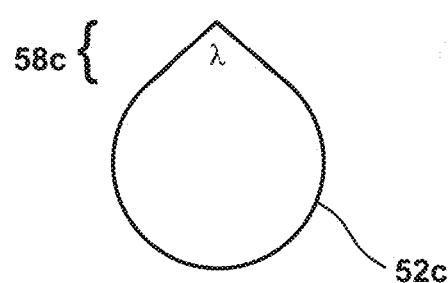
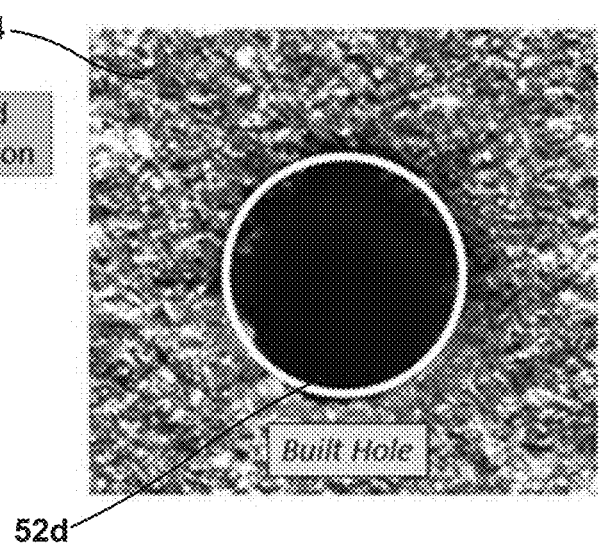
FIG. 7A  FIG. 7B

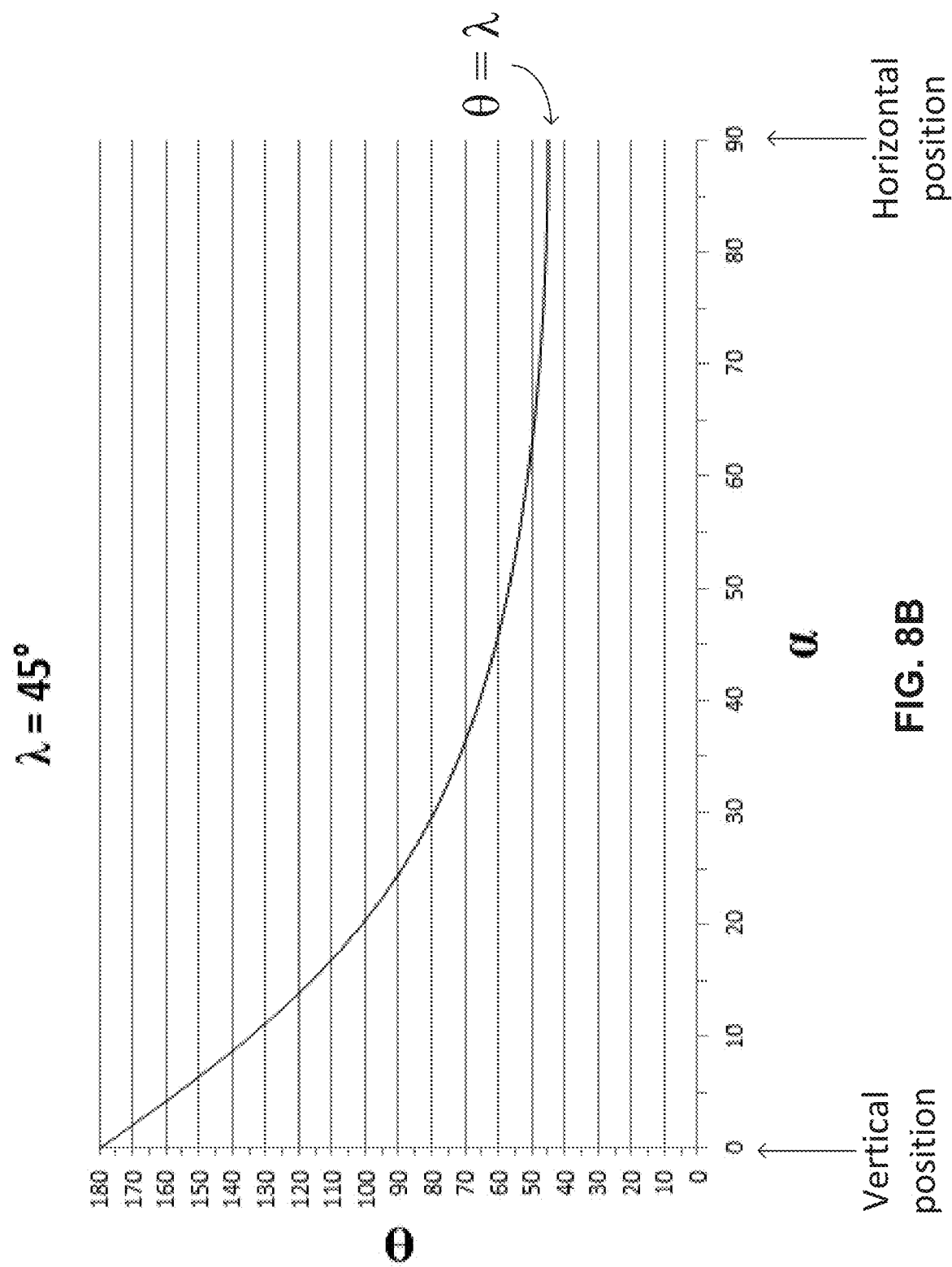

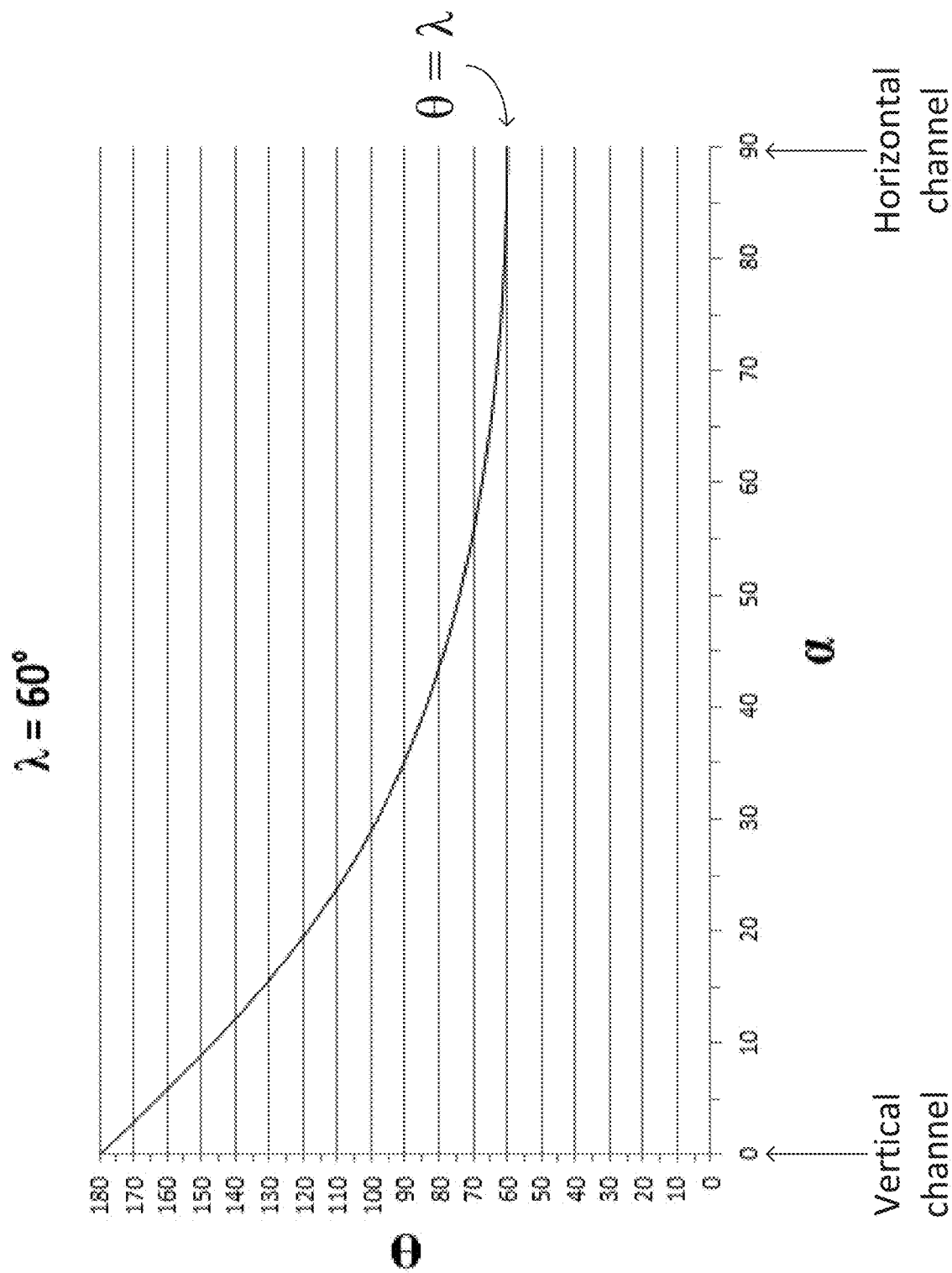

ADDITIVELY MANUFACTURED COMPONENTS INCLUDING CHANNELS

This application claims the benefit of U.S. Provisional Application No. 62/329,038 filed Apr. 28, 2016, which is incorporated herein by reference in its entirety.

TECHNICAL FIELD

The present disclosure generally relates to additive manufacturing of components that include a channel.

BACKGROUND

Additive manufacturing may be used to fabricate a component having a predetermined three-dimensional structure, typically by depositing material layer-by-layer or volume-by-volume to form the structure, rather than by removing material from an existing component. Additive manufacturing may be advantageous in many situations, such as rapid prototyping, forming components with complex three-dimensional structures, or the like. In some examples, additive manufacturing may utilize powdered materials and may melt or sinter the powdered material together in predetermined shapes, rather than depositing material at selected locations, to form the three-dimensional structures. In some examples, additive manufacturing techniques may include techniques such as fused deposition modeling, electron beam melting, selective laser sintering or selective laser melting, and stereolithography.

SUMMARY

In some examples, the disclosure describes an example technique that includes defining, by a computing device, a digital representation of an inclined channel at least partially within a component, including an angle $\theta$, based on a formula $\theta=2 \tan^{-1} [\tan(\lambda/2)/\sin(\alpha)]$, the angle $\lambda$, and the angle $\alpha$. The inclined channel may define a longitudinal axis inclined at the angle $\alpha$ relative to a build direction of the component. The digital representation of the inclined channel may include a gabled roof configured to collapse into an arched roof. The angle $\lambda$ may be a predetermined interior angle of the gabled roof measured in a plane substantially parallel to the build direction. The angle $\theta$ may be an interior angle of the gabled roof in a plane substantially normal to the inclined longitudinal axis. The example technique may include controlling, by the computing device, based on the digital representation, an additive manufacturing tool to deposit a material along the build direction to fabricate the component including the inclined channel having a geometry at least partially defined by the angles $\theta$, $\lambda$, and $\alpha$.

In some examples, the disclosure describes an example system that includes a computing device, and an additive manufacturing tool configured to fabricate a component. The computing device may be configured to define a digital representation of an inclined channel at least partially within the component, including an angle $\theta$ based on a formula $\theta=2 \tan^{-1} [\tan(\lambda/2)/\sin(\alpha)]$, the angle $\lambda$, and the angle $\alpha$. The inclined channel may define a longitudinal axis inclined at the angle $\alpha$ relative to a build direction of the component. The digital representation of the inclined channel may include a gabled roof configured to collapse into an arched roof. The angle $\lambda$ may be a predetermined interior angle of the gabled roof measured in a plane substantially parallel to the build direction. The angle $\theta$ may be an interior angle of the gabled roof in a plane substantially normal to the inclined longitudinal axis. The computing device may be configured to control, based on the digital representation, the additive manufacturing tool to deposit a material along the build direction to fabricate the component including the inclined channel having a geometry at least partially defined by the angles $\theta$, $\lambda$, and $\alpha$.

In some examples, the disclosure describes an example computer readable storage medium that may include instructions that, when executed, cause at least one processor to define a digital representation of an inclined channel at least partially within a component, including an angle $\theta$, based on a formula $\theta=2 \tan^{-1} [\tan(\lambda/2)/\sin(\alpha)]$, the angle $\lambda$, and the angle $\alpha$. The inclined channel may define a longitudinal axis inclined at the angle $\alpha$ relative to a build direction of the component. The digital representation of the inclined channel may include a gabled roof configured to collapse into an arched roof. The angle $\lambda$ may be a predetermined interior angle of the gabled roof measured in a plane substantially parallel to the build direction. The angle $\theta$ may be an interior angle of the gabled roof in a plane substantially normal to the inclined longitudinal axis. The instructions, when executed, may cause the at least one processor to control, based on the digital representation, an additive manufacturing tool to deposit a material along the build direction to fabricate the component including the inclined channel having a geometry at least partially defined by the angles $\theta$, $\lambda$, and $\alpha$.

The details of one or more examples are set forth in the accompanying drawings and the description below. Other features, objects, and advantages will be apparent from the description and drawings, and from the claims.

BRIEF DESCRIPTION OF DRAWINGS

FIG. 2A is a conceptual and schematic block diagram illustrating a digital representation including an example horizontal channel having gabled roof.

FIG. 2B is a conceptual and schematic block diagram illustrating a pre-collapse cross-section of an additively manufactured component including a horizontal channel, at a plane corresponding to plane A-A of the digital representation of FIG. 2A.

FIG. 2C is a conceptual and schematic block diagram illustrating a post-collapse cross-section of an additively manufactured component including a horizontal channel, at a plane corresponding to plane A-A of the digital representation of FIG. 2A.

FIG. 3A is a conceptual and schematic block diagram illustrating a digital representation of an inclined channel having a controlled-collapse gabled roof defining a teardrop cross-section.

FIG. 3B is a conceptual and schematic block diagram illustrating a pre-collapse cross-section of an inclined channel of an additively manufactured component, at a plane corresponding to plane B-B normal to the longitudinal axis of the digital representation of FIG. 3A.

FIG. 3C is a conceptual and schematic block diagram illustrating a post-collapse cross-section of an inclined channel of an additively manufactured component, at a plane corresponding to plane B-B of FIG. 3A.

FIG. 3D is a conceptual and schematic block diagram illustrating a pre-collapse cross-section of an inclined channel of the additively manufactured component of FIG. 3B, at a plane corresponding to plane C-C of FIG. 3A.

FIG. 3E is a conceptual and schematic block diagram illustrating a post-collapse cross-section of an inclined channel of the additively manufactured component of FIGS. 3B and 3D, at a plane corresponding to plane C-C of FIG. 3A.

FIG. 4A is a conceptual and schematic block diagram illustrating a digital representation of a vertical channel having a circular cross-section.

FIG. 4B is a conceptual and schematic block diagram illustrating the post-fabrication pf am additively manufactured component including a vertical channel at a plane corresponding to plane D-D of digital representation of FIG. 4A.

FIG. 5 is a flow diagram illustrating an example technique for additive manufacturing of a component including a channel having a predetermined cross-section.

FIG. 6A is a conceptual and schematic block diagram illustrating a digital representation of a circular cross-section of a horizontal channel.

FIG. 6B is a photograph illustrating a collapsed cross-section of a horizontal channel having a sagging roof deposited using the digital representation of FIG. 6A.

FIG. 7A is a conceptual and schematic block diagram illustrating a digital representation of a teardrop cross-section of a horizontal channel.

FIG. 7B is a photograph illustrating a collapsed cross-section of a horizontal channel having a circular arched roof deposited using the digital representation of FIG. 7A.

FIG. 8B is a chart illustrating a relationship between an inclination angle $\alpha$ of an inclined channel and the angle $\theta$ defined by a gabled roof of the inclined channel, when a predetermined angle $\lambda$ defined by a horizontal gabled roof equals 45°.

FIG. 8C is a chart illustrating a relationship between an inclination angle $\alpha$ of an inclined channel and the angle $\theta$ defined by a gabled roof of the inclined channel, when a predetermined angle $\lambda$ defined by a horizontal gabled roof equals 60°.

DETAILED DESCRIPTION

Figure 1B:
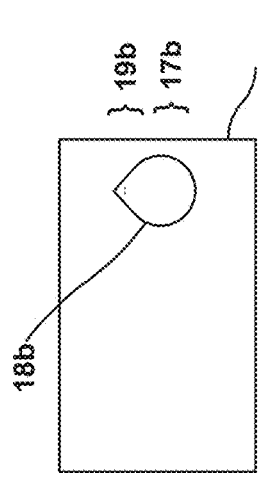
FIG. 1B is a conceptual and schematic cross-sectional block diagram illustrating a digital representation of a channel having a teardrop cross-section.

The disclosure describes example systems and techniques for additively manufacturing components defining inclined channels having arched roofs, for example, roofs defining substantially circular or elliptical arcs (e.g., circular or elliptical arcs or nearly circular or elliptical arcs). Additive manufacturing systems typically deposit successive layers or volumes of material along a build direction based on a digital representation of a component, and cure or join the deposited material or selective portions of the deposited material with an energy beam. In some examples, the material may be deposited as a solid material, then heated or cured to melt, sinter, or react to join the deposited material or selective portions of the deposited material. During the heating or curing, components fabricated by additive manufacturing may exhibit post-deposition or post-fabrication changes in geometry or configuration. For example, a channel having a target arched roof that is fabricated with an initial arched roof may collapse in a direction substantially anti-parallel to the build direction because of gravitational or other forces.

In accordance with examples of this disclosure, to compensate for such collapse, a digital representation of an inclined channel (according to which the additive manufacturing system deposits and joins material) having a target arched roof may be modified so that in the modified digital representation, the inclined channel has a gabled roof. The gabled roof may define an interior angle $\theta$ in a plane substantially normal to a longitudinal axis of the inclined channel. For example, the modified inclined channel may have a teardrop cross-section in a plane parallel to the build direction. A component fabricated by additive manufacturing based on the modified digital representation may exhibit a gabled roof or a teardrop cross-section during or immediately after fabrication. The gabled roof may collapse into the target arched roof during or after the fabrication. Thus, a pre-collapse gabled roof in the digital representation may lead to the formation of a post-collapse arched roof of the inclined channel in an additively manufactured component.

The interior angle $\lambda$ defined by the peak of the gabled roof in the plane substantially parallel to the build direction may influence the post-collapse geometry of the resulting arched roof. For example, the angle $\lambda$ may affect the final curvature of the post-collapse arched roof. Therefore, the angle $\lambda$ may be determined based on known relations between the respective angle $\lambda$ defined by the pre-collapse gabled roof and the respective resulting curvature defined by the post-collapse arched roof. For example, a plurality of respective $\lambda$ angles and resulting arched roof shapes may be determined for a horizontal channel defined by a component including substantially the same material fabricated using substantially the same additive manufacturing technique and used to calculate the interior angle $\theta$ defined by a gabled roof of an inclined channel. The angle $\lambda$ and the angle $\alpha$ at which the channel is inclined relative to the build direction may be used to calculate the interior angle $\theta$ using EQUATION 1.

$$\theta = 2\tan^{-1}[\tan(\lambda/2)/\sin(\alpha)] \qquad \text{(EQUATION 1)}$$

A digital representation of the channel can then be defined at least partially based on the angles $\theta$, $\lambda$, and $\alpha$. Thus, the predetermined angles $\lambda$ for gabled roofs based on the known relations for horizontal channels may be used to modifying the build shape of inclined channels, by compensating for the direction in which forces causing collapse may tend to act, typically anti-parallel to the build direction. That direction may not be perpendicular to the longitudinal axis of the channel in the case of an inclined channel, and the collapsing forces may not be completely resolved along the angle $\alpha$. Further, the interior angle $\theta$ defined by the gabled roof in a plane substantially normal to the inclined longitudinal axis may differ from the interior angle $\lambda$ defined by the gabled roof in a plane substantially parallel to the build or vertical direction, based on the angle of inclination $\alpha$. For substantially horizontal channels, or channels having inclination angles close to 90°, the interior angle $\theta$ may be relatively close to $\lambda$. For substantially vertical channels, or channels having inclination angles close to 0°, the interior angle $\theta$ may be relatively close to 180°, indicating that the gabled roof may be flattened as the inclination of the channel tends to the vertical. For example, for a completely vertical channel aligned with the build direction, collapsing forces are likely to be ineffective in the plane normal to the vertical direction, because of which the cross-section of a completely vertical channel would not be expected to change. However, for channels inclined at angles between 0° and 90°, the interior angle θ may respectively vary between values of 180° and λ. The formula of EQUATION 1 can be used to determine the interior angle θ, based on the angle of inclination α of the inclined channel relative to the build direction, and the interior angle λ.

A gabled roof having the angle θ defined by EQUATION 1 in a plane substantially normal to the inclined longitudinal axis will define the angle λ in a plane substantially parallel to the build or vertical direction. Therefore, collapsing forces in the vertical or build direction will be effective antiparallel to the build direction to collapse each respective vertical section or slice of the roof based on the angle λ, so that the collapse results in a post-collapse arched roof having a known curvature in a plane substantially parallel to the build direction. The known curvature of the arched roof in the build direction can be related to a target curvature of the arched roof in a plane substantially normal to the inclined longitudinal axis of the channel. Thus, the target arched roof may be attained by providing a digital representation of the component with a gabled roof defining the interior angle θ in a plane substantially normal to the inclined longitudinal axis. During or after fabrication of the component by additive manufacturing based on the digital representation, the fabricated gabled roof of the fabricated inclined channel may collapse into the target arched roof.

Thus, in accordance with examples of this disclosure, systems and techniques are provided to fabricate components defining an inclined channel having a target arched roof.

Figure 1C:
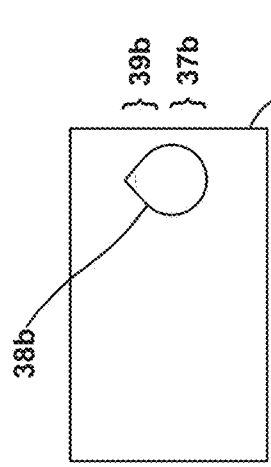
FIG. 1C is a conceptual and schematic block diagram illustrating a pre-collapse configuration of an additively manufactured component including a channel having a teardrop cross-section.
Figure 1D:
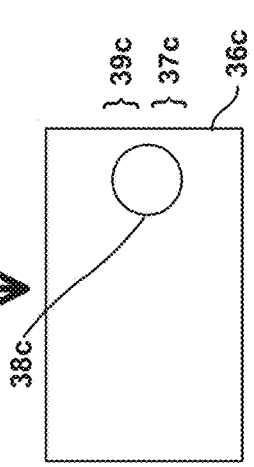
FIG. 1D is a conceptual and schematic block diagram illustrating a post-collapse configuration of the additively manufactured component of FIG. 1C, wherein the post-collapse channel has a predetermined cross-section post-collapse.
Figure 1A:
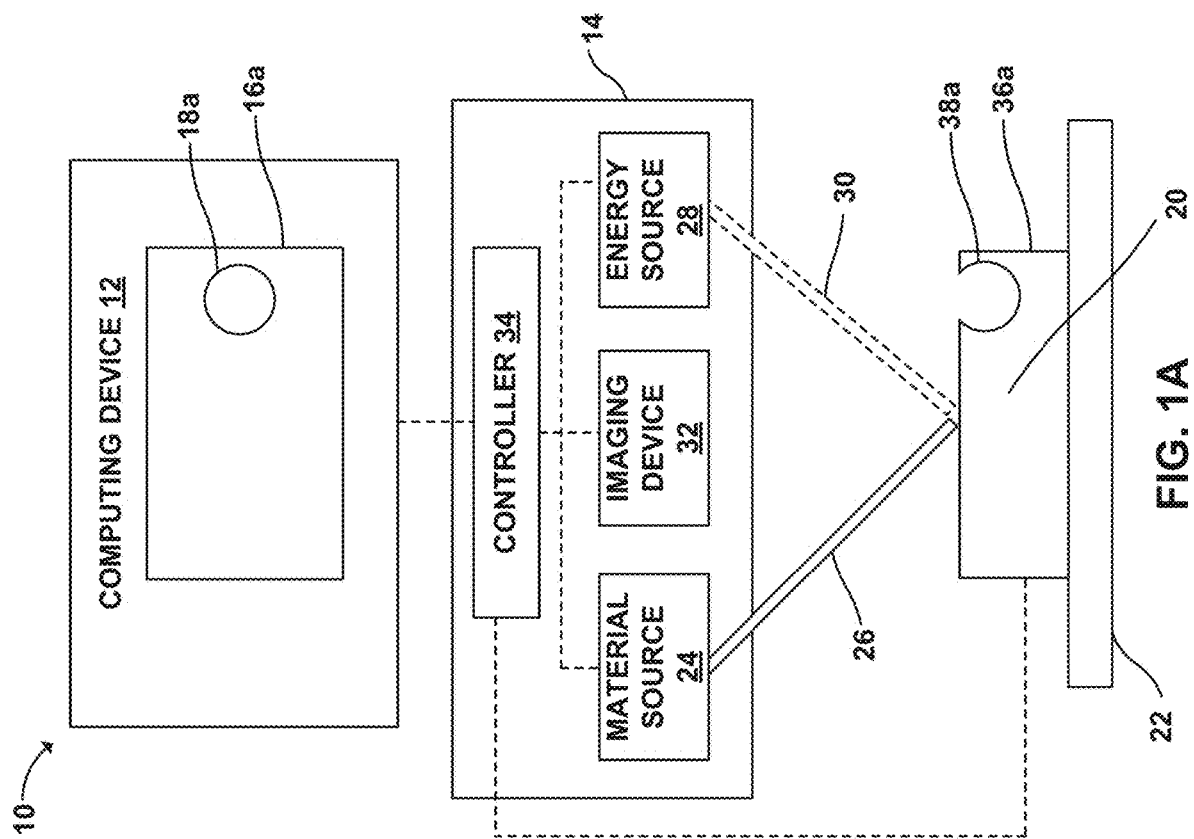
FIG. 1A is a conceptual and schematic block diagram illustrating an example system for additively manufacturing a component including a channel having a predetermined cross-section.

FIG. 1A is a conceptual and schematic block diagram illustrating an example system 10 for additively manufacturing a component including a channel having a predetermined cross-section. Example system 10 includes a computing device 12 that may control an additive manufacturing tool 14 for fabricating a component 36a that includes a material 20 defining a channel 38a. In some examples, computing device 12 may generate or store a digital representation 16a of component 36a that includes a channel 18a generally corresponding to channel 38a of the component. In some examples, computing device 12 may control additive manufacturing tool 14 to fabricate component 36a based on digital representation 16a. In some examples, additive manufacturing tool 14 may include a controller 34 for controlling one or more of a material 24, and energy source 28, and an imaging device 32.

Computing device 12 may send control signals to controller 34 for controlling additive manufacturing tool 14. For example, computing device 12 may send operational signals to and receive status signals from controller 34 to control and monitor the operation of additive manufacturing tool 14. In some examples, computing device 12 may not control additive manufacturing tool 14, and controller 34 may be configured to receive signals indicative of digital representation 16a from computing device 12 and to control additive manufacturing tool 14 based on digital representation 16a to fabricate component 36a.

In some examples, controller 34 may control material source 24 of additive manufacturing tool 14 to direct a material stream 26 including material 20 at a build location on component 36a, which is carried on a build platform 22. In some examples, material 20 may include metal, alloy, plastic, glass, ceramic, combinations thereof, or any suitable material composition that may be used to fabricate an additively manufactured component.

Controller 34 also may control energy source 28 to direct an energy beam 30 at the build location. Energy beam 30 may interact with material 20 at the build location, for example, by fusing, melting, sintering, curing, solidifying or otherwise modifying material 20 at the build location to cause material 20 to be joined to other material of component 36a at the build location. Energy beam 30 may include any energy, for example, ultraviolet light, electron beam, plasma, or laser, that may interact with material 20 to change a state of material 20. For example, energy beam 30 may be focusable or directable towards material 20. In some examples, the build location at which energy beam 30 interacts with material stream 26 is adjacent an existing surface of component 36a such that material 20 is added to component 36a. In some examples, controller 34 may control energy source 28 to emit a diffuse energy beam, or a patterned array of beams, for example, a light pattern. The build location may change as component 36a is fabricated, for example, along regions or surfaces of partly fabricated component 36a. In some examples, controller 34 may cause additive manufacturing tool 14 to fabricate component 36a by depositing material 20 at different build locations along a tool path, so that material 20 is ultimately deposited along a predetermined build direction, for example a vertical build direction upwards (for example, against a gravitational force) or downwards (for example, toward a gravitational force).

In some examples, build platform 22 may remain stationary as component 36a is fabricated. In other examples, build platform 22 may be movable or rotatable, for example, along multiple axis, and controller 34 may control the position of build platform 22. In some examples, controller 34 may successively move build platform 22 against the build direction, or to change the build location by changing the orientation of build platform 22, and that of component 36a, relative to material stream 26 and energy beam 30.

In some examples, controller 34 may separately control material source 24 and energy source 28, for example, by separately controlling material source 24 to direct material stream 26 to deposit a layer or volume of material 20, and then controlling energy source 28 to direct energy beam 30 along a series of build locations within the deposited layer or volume of material 20 to energize material 20 at the build locations to fabricate component 36a. Therefore, controller 34 may direct build location along a two-dimensional or three-dimensional tool path to fabricate component 36a based on digital representation 16a.

In some examples, controller 34 may control imaging device 32 to image surfaces or regions or volumes of one or more of component 36a, the build location, or platform 22 to generate respective build images periodically or continuously. Controller 34 may periodically or continuously compare the build images with the digital representation 16a to verify that component 36a substantially conforms (e.g., conforms or nearly conforms) to digital representation 16a. In some examples, controller 34 may control one or more of material source 24, energy source 28, and build platform 22 based on the build images and the digital representation 16a. For example, controller 34 may be configured to control build platform 22 and material source 24, energy source 28, and/or imaging device 32 to translate and/or rotate along at least one axis to position component 36a relative to material stream 26, energy beam 30, and/or imaging device 32. Positioning component 36a relative to material stream 26, energy beam 30, and/or imaging device 32 may include positioning a predetermined surface (e.g., a surface to which material is to be added) of component 36a in a predetermined orientation relative to material source 24, energy source 28, and/or imaging device 32, so that material is added in regions or volumes defined by digital representation 16a.

In some examples, additive manufacturing tool 14 may not include controller 34, and computing device 12 may control one or more of material source 24, energy source 28, imaging device 32, and build platform 22, instead of controller 34.

In some examples, the geometry or configuration of component 36a may not conform to that of digital representation 16a, for example, because of post-deposition changes to material 20 in component 36a. For example, material 20 may continue to be soft or otherwise deformable for a period of time immediately after deposition, and may move, shift or collapse based on weight exerted by surrounding material 20 of component 36a. For example, material 20 may move, shift, or partially or completely collapse into vacant channels or volumes within component 36a. In some examples, while channel 38a of component 36a may conform to channel 18a of digital representation 16a for a relatively short period immediately after additive manufacturing tool 14 deposits material 20 in a volume defining channel 38a, the weight of material 20 surrounding channel 38a may push the walls of channel 38a, commencing deformation, and eventually, channel 38a may partially or completely collapse. According to various examples of the disclosure, digital representation 16a may include channel 18a that has a pre-collapse geometry or configuration configured to form a target post-collapse geometry or configuration, so that channel 38a of component 36a initially has a pre-collapse geometry that collapses to form the target geometry post-collapse. For example, a channel having a pre-collapse tear-drop cross section (shown in FIG. 1C) may collapse to form a post-collapse substantially circular cross-section (shown in FIG. 1D).

FIG. 1B is a conceptual and schematic cross-sectional block diagram illustrating a digital representation 16b of a component including a channel 18b having a teardrop cross-section. The cross-section illustrated in FIG. 1B is in a plane substantially parallel to a build direction of the component built according to digital representation 16b. Channel 18b defines a longitudinal axis that is inclined relative to a horizontal plane substantially normal to the build direction. The teardrop cross-section may be defined by a substantially circular portion and a controlled-collapse gabled roof 19b, as illustrated in FIG. 1B. The shape of the controlled-collapse gabled roof 19b, including its interior angle, may be selected to result in a channel having a predetermined cross-section after a channel built according to digital representation 16b partially collapses.

FIG. 1C is a conceptual and schematic block diagram illustrating a pre-collapse configuration of an additively manufactured component 36b including a channel 38b having a teardrop cross-section, for example substantially conforming to the teardrop cross-section of channel 18b of digital representation 16b. The cross-section illustrated in FIG. 1C is in a plane substantially parallel to a build direction of pre-collapse additively manufactured component 36b. Channel 38b defines a longitudinal axis that is inclined relative to a horizontal plane substantially normal to the build direction. System 10 has additively manufactured component 36b according to digital representation 16b. As shown in FIG. 1C, channel 38b defines a teardrop cross-section including a controlled-collapse gable roof 39b and a substantially circular portion 37b, which may substantially correspond to (e.g., correspond to or nearly correspond to) controlled-collapse gabled roof 19b and substantially circular portion 17b, respectively, of digital representation 16b.

FIG. 1D is a conceptual and schematic block diagram illustrating a post-collapse configuration of additively manufactured component 36b of FIG. 1C, wherein post-collapse channel 38c formed by collapse of pre-collapse channel 38b has a predetermined cross-section post-collapse. In the example illustrated in FIG. 1D, the predetermined cross-section is substantially circular, including a substantially circular arched roof 39c, and a substantially circular portion 37c. The cross-section illustrated in FIG. 1D is in a plane substantially parallel to a build direction of additively manufactured component 36b. Channel 38b defines a longitudinal axis that is inclined relative to a horizontal plane substantially normal to the build direction. Thus, in some examples, digital representation 16b includes a pre-collapse geometry of channel 18b configured to result in post-collapse target geometry of channel 38c via collapse of pre-collapse configuration of channel 38b that substantially conforms to (e.g., conforms to or nearly conforms to) channel 18b.

FIG. 2A is a conceptual and schematic block diagram illustrating a digital representation 16d including an example horizontal channel 18d having a gabled roof 19d. In some examples, channel 18d and gabled roof 19d may define a teardrop cross-section. However, channel 18d and gabled roof 19d may define any predetermined cross-section that may include one or more lines, curves, polygons, apices, or the like. Controller 34 may control additive manufacturing tool 14 to fabricate component 36a that includes a horizontal channel 38d substantially conforming to horizontal channel 18d of digital representation 16d. Horizontal channel 38d may thus include a gabled roof 38d that substantially conforms to gabled roof 19d. For example, FIG. 2B is a conceptual and schematic block diagram illustrating a pre-collapse cross-section of horizontal channel 38d of additively manufactured component 36d, at a plane corresponding to the plane A-A of digital representation 16d of FIG. 2A. Gabled roof 39d may define an interior angle $\lambda$, in a plane normal to a longitudinal axis of channel 38d, for example, at a plane that corresponds to plane A-A, normal to a longitudinal axis of horizontal channel 38d that corresponds to longitudinal axis 15d of horizontal channel 18d of digital representation 16d.

In some examples, gabled roof 39d and inclined channel 38d may define a predetermined teardrop cross-section in a plane normal to the longitudinal axis of channel 38d, as shown in FIG. 2B. In some examples, gabled roof 39d may be configured to collapse anti-parallel to a build direction corresponding to build direction 13d associated with digital representation 16d, into an arched roof, for example, an arched roof 39e of post-collapse channel 38e illustrated in FIG. 2C. FIG. 2C is a conceptual and schematic block diagram illustrating a post-collapse cross-section of horizontal channel 39e, at a plane that corresponds the plane A-A of digital representation 16d of FIG. 2A. As seen in FIGS. 2B and 2C, pre-collapse gabled roof 39d of pre-collapse channel 38d defining the predetermined angle $\lambda$ is configured to collapse into post-collapse arched roof 39e of post-collapse channel 38e. In some examples, predetermined angle $\lambda$ is determined by performing tests on a plurality of test coupons, each respective test coupon of the plurality of test coupons including a volume of material 20 defining a respective horizontal test channel having a respective candidate gable angle of a plurality of candidate gable angles, and allowing each of the respective horizontal test channels to collapse. The respective candidate gable angles may then be mapped to resulting channel cross-section geometries, for example, resulting arc curvatures. Thus, an appropriate respective gable angle may be selected from the plurality of candidate gable angles based on the arc curvature the respective post-collapse horizontal channel that most closely conforms to the target post-collapse geometry. Predetermined angle $\lambda$ may depend on the composition of material 20, operational parameters of material source 24 and energy source 28, operational characteristics of material stream 26 and energy beam 30, the build direction, gravitational and other forces that may act on component 36a, and the speed at which component 36d is built. Therefore, predetermined angle $\lambda$ may be selected based on the operating parameters and conditions for fabricating component 36d using additive manufacturing tool 14.

In accordance with examples of this disclosure, the build direction may refer to an overall build direction, for example, build direction 15d shown in FIG. 2A. Thus, controller 34 may control additive manufacturing tool 14, based on digital representation 16d, to deposit material along a direction that corresponds to build direction 15d associated with digital representation 16d of FIG. 2A to fabricate component 36d of FIG. 2B. However, the path along which additive manufacturing tool 14 deposits material 20 may not always be along the overall build direction. For example, while controller 34 may control additive manufacturing tool 14 to deposit material 20 in successive layers along the overall build direction, additive manufacturing tool 14 may deposit material 20 along a different direction within a respective layer of the successive layers. In some examples, controller 34 may control additive manufacturing tool 14 to deposit material 20 along an intra-layer tool path, and the tool path may include path sections aligned along different intra-layer build directions. The overall build direction relative to the longitudinal axis of digital representation 16d or component 36d may thus differ from intra-layer build directions relative to the longitudinal axis. In some examples, predetermined angle $\lambda$ may depend on one or more of the overall build direction or intra-layer build directions.

In the case of a horizontal channel, $\theta=\lambda$, as shown in FIG. 2B, since the plane normal to the longitudinal axis of the channel aligns with the vertical or the build direction. However, if the channel is inclined, for example, as in the case of an inclined channel 18f inclined at an angle $\alpha$ with respect to a build or vertical direction 13f, as illustrated in FIG. 3A, the plane normal to the longitudinal axis, for example, plane B-B, may be substantially mis-aligned with build direction 13f In examples where the channel is inclined relative to the build direction, the direction in which collapsing forces are exerted (which may be antiparallel to the build direction in some examples) may be vertical, while the roof of the channel may be inclined along an inclined longitudinal axis. Thus, the post-collapse cross-section for an inclined channel may not conform to the post-collapse cross-section of a horizontal channel even if the gabled roof of the inclined channel defines the predetermined angle $\lambda$ in a plane normal to the inclined longitudinal axis. Instead, the pre-collapse gabled roof of an inclined channel may be configured such that the gabled roof defines an angle $\theta$ in the plane normal to the inclined longitudinal axis a, where the angle $\theta$ is calculated based on the angle $\alpha$ such that the gabled roof defines the predetermined angle $\alpha$ in a plane substantially parallel to the build direction. For example, for inclined channels, the angle $\theta$ defined by the roof in a plane substantially normal to the inclined longitudinal axis may be determined using EQUATION 1 such that the gabled roof defines the predetermined angle $\lambda$ in a plane substantially parallel to the build direction or the vertical direction.

FIG. 3A is a conceptual and schematic block diagram illustrating a digital representation 16f of inclined channel 18f having a controlled-collapse gabled roof 19f defining a teardrop cross-section. Inclined channel 18f defines a longitudinal axis 15f that is inclined at an angle $\alpha$ with respect to the build or vertical direction 13f.

FIG. 3B is a conceptual and schematic block diagram illustrating a pre-collapse cross-section of pre-collapse channel 38f of additively manufactured component 36f, at a plane corresponding to plane B-B normal to longitudinal axis 15f of digital representation 16f of FIG. 3A. As seen in FIG. 3B, gabled roof 39f of pre-collapse channel 38f defines the angle $\theta$ in a plane substantially normal to the inclined longitudinal axis of inclined channel 36c, for example, in a plane that corresponds to plane B-B, normal to a longitudinal axis of horizontal channel 38f that corresponds to longitudinal axis 15f of inclined channel 18f of digital representation 16f In contrast, gabled roof 38f defines the predetermined angle $\lambda$, in a plane substantially parallel to the build direction, as shown in FIG. 3D. FIG. 3D is a conceptual and schematic block diagram illustrating a pre-collapse cross-section of gabled roof 38c of channel 38f of additively manufactured component 36d, at a plane corresponding to plane C-C, in build direction 13f associated with digital representation 16f of FIG. 3A.

The respective post-collapse channels are shown in FIGS. 3C and 3E. Pre-collapse component 36f of FIGS. 3B and 3D forms post-collapse component 36g, shown in FIGS. 3C and 3E. FIG. 3C is a conceptual and schematic block diagram illustrating a post-collapse cross-section of channel 38g of component 36g, at a plane corresponding to plane B-B, normal to the longitudinal axis of inclined channel 38g, of digital representation 16f of FIG. 3A. Interior angle $\theta$ defined by pre-collapse gabled roof 38f can be calculated based on predetermined angle $\lambda$ and the angle $\alpha$, so that the post-collapse cross-section of channel 38g is substantially circular, as shown in FIG. 3C, regardless of the angle $\alpha$ at which the inclined channel is inclined. In some examples, EQUATION 1 may be used to determine $\theta$ based on the angle $\alpha$ and the angle $\lambda$.

Thus, for a known predetermined angle $\lambda$ for a horizontal gabled roof configured to collapse into an arched roof, angle $\theta$ may be calculated based on the angle of inclination $\alpha$, for any angle $\alpha$. Further, $\alpha=90°$ corresponds to a horizontal channel, in which case, $\theta=\lambda$ according to EQUATION 1. Thus, as expected, for a horizontal channel, the angle $\theta$ of the gabled roof defined in a plane substantially normal to the longitudinal axis is equal to the predetermined angle $\lambda$, resulting in a post-collapse horizontal channel having a substantially circular cross-section, as shown in FIG. 2C.

Post-collapse arched roof 39g and inclined channel 38g define a predetermined substantially circular or elliptical cross-section in a plane normal to the inclined longitudinal axis of inclined channel 38g, as shown in FIG. 3C. In some examples, arched roof 39g may define an arc in a plane normal to the inclined longitudinal axis of inclined channel 38g that is substantially similar to a horizontal arc defined by a horizontal arched roof 39e in a plane normal to a horizontal longitudinal axis of horizontal channel 38e of FIG. 2C. In some examples, the arc of arched roof 39g may include a substantially circular arc, or a substantially elliptical arc.

FIG. 3E is a conceptual and schematic block diagram illustrating a post-collapse cross-section of post-collapse inclined channel 38g of additively manufactured component 36f of FIGS. 3B and 3D, at a plane corresponding to plane C-C of FIG. 3A. As seen in FIGS. 3C and 3E, channel 38g may define a substantially elliptical cross-section in a plane inclined to the build direction, while defining a substantially circular cross-section in a plane parallel to the build direction.

If the angle of inclination of a channel increases, for example, as the longitudinal axis of the channel approaches the build or vertical direction, the effect of collapsing forces on the roof of the channel may decrease, such that in the case of a completely vertical channel, the collapsing forces would tend to act along a longitudinal axis of the channel, rather than against the portion of the channel that corresponds to a roof of an inclined channel. Thus, for a completely vertical channel, collapsing forces may be substantially ineffective in deforming the walls of the channel. FIG. 4A is a conceptual and schematic block diagram illustrating a digital representation 16h of a vertical channel 18h having a circular cross-section. For vertical channel 18h, $\alpha=0°$, in which case $\theta=180°$ according to EQUATION 1. A roof defining an angle 180° may correspond to a roof that does not define an interior angle. Thus, a gabled roof may be flattened as a channel approaches a vertical or build direction, and replaced with a smooth arched roof in a completely vertical configuration, because a collapse against the build direction would not be effective to deform the cross-section of vertical channel 18h, which is normal to a build direction 13h. FIG. 4B is a conceptual and schematic block diagram illustrating the post-fabrication cross-section of an additively manufactured component 36h including vertical channel 18h at a plane corresponding to plane D-D of digital representation 16h of FIG. 4A. As shown in FIG. 4B, vertical channel 38h exhibits no collapse, and the cross-section continues to remain substantially the same after fabrication, and is substantially similar to a cross-section of channel 18h of digital representation 16h in a plane normal to build direction 13h.

Thus, a computing device 12 or controller 34 may utilize EQUATION 1 to calculate angle $\theta$ defined by a pre-collapse gabled roof of an inclined channel inclined at an angle $\alpha$, such that the post-collapse inclined channel will define an arched roof, based on a predetermined angle $\lambda$ of a pre-collapse gabled roof of a horizontal channel defined by a volume of material additively fabricated by substantially the same additive manufacturing technique used to fabricate the component defining the inclined channel.

While the channels described in some examples above have substantially circular cross-sections, in some examples, an inclined channel may exhibit any closed cross-section, as long as a target post-collapse configuration or geometry of the inclined channel includes an arched roof. For example, the target inclined channel may have any arbitrary curved or polygonal contour on the sides and the bottom of the channel, while having an arched upper contour or roof. Further, the arched upper roof may include a circular arc, an elliptical arc, and oval arc, or the like.

FIG. 5 is a flow diagram illustrating an example technique for additive manufacturing of a component including a channel having a predetermined cross-section. The example technique of FIG. 5 may partly or wholly be performed by example system 10 of FIG. 1, and is described in some examples below with reference to example system 10 and based on digital representation 16f of FIG. 2B. However, in some examples, one or more steps of the example technique of FIG. 5 may be performed by other example systems based on other digital representations.

The example technique of FIG. 5 may include defining, by computing device 12, digital representation 16f of inclined channel 18f at least partially within a component (40). Inclined channel 18f may include angle $\theta$, based on the formula of EQUATION 1, the angle $\lambda$, and the angle $\alpha$. Inclined channel 18f may define longitudinal axis 15f inclined at the angle $\alpha$ relative to build direction 13f of the component. Digital representation 16f of inclined channel 18f may include gabled roof 19f configured to collapse into an arched roof. For example, gabled roof 19f of digital representation 16f may correspond to gabled roof 39f of inclined channel 38f of component 36f additively manufactured by system 10 based on digital representation 16f. The angle $\lambda$ may be a predetermined interior angle of gabled roof 19f of digital representation 16f (or of gabled roof 39f of component 36f) measured in a plane substantially parallel to build direction 13f, for example, plane C-C. The angle $\theta$ may be an interior angle of gabled roof 19f in a plane substantially normal to inclined longitudinal axis 15f, for example, plane B-B.

In some examples, step 40 of the example technique of FIG. 5 may include, identifying, by computing device 12, the target arched roof in digital representation 16f. For example, computing device 12 may analyze digital representation 16f to determine all surfaces defined by internal voids or channels, and may determine a curvature and orientation of each surface over an enclosed void or channel to determine if a curved surface represents an arched roof. In some examples, step 40 of the example technique of FIG. 5 may include, modifying, by computing device 12, digital representation 16f by replacing the target arched roof with gabled roof 19f in digital representation 16f In some examples, gabled roof 19f may be configured to collapsed into arched roof 38g, such that arched roof 38g may be substantially similar to the target arched roof of digital representation 16f Thus, in some examples, the example technique of FIG. 5 may include, by computing device 12, controlling additive manufacturing tool 14 based on the modified digital representation 16f to fabricate component 36f, so that fabricated component 36f may initially include gabled roof 39f instead of the target arched roof, but collapse to include post-collapse arched roof 39g that may be substantially similar to the target arched roof.

In some examples, computing device 12 may compare a geometry of the target arched roof to geometries of known channels. For example, the technique of FIG. 5 may include determining, by computing device 12, a target arc defined by the target arched roof in a plane substantially parallel to build direction 13f In some examples, the technique of FIG. 5 may include selecting, by computing device 12, a candidate arc of a plurality of candidate arcs by matching the target arc with the plurality of candidate arcs based on a match between the candidate arc and the target arc. Each respective candidate arc of the plurality of candidate arcs may be defined by a respective horizontal arched roof formed by collapse of a respective horizontal gabled roof having a respective candidate angle of a plurality of candidate angles. For example, the plurality of candidate arcs and the plurality of candidate angles may be known or predetermined and stored in a database, or may be calculated, interpolated or extrapolated based on known candidate angles and arcs. In some examples, computing device 12 may set the angle $\lambda$ to the candidate angle associated with the selected candidate arc. For example, setting the angle $\lambda$ to the candidate angle may result in a post-collapse arched roof 39g defining an arc substantially similar to the selected candidate arc and the target arc. In some examples, arched roof 39g may define an arc in a plane substantially parallel to the build direction that may be substantially similar to a horizontal arc defined by a horizontal arched roof formed by collapse of a horizontal test channel having a horizontal gabled roof having the interior angle λ.

The example technique of FIG. 5 may include, controlling, by computing device 12, based on digital representation 16f, additive manufacturing tool 14 to deposit material 20 along build direction 13f to fabricate component 36f including inclined channel 38f having a geometry at least partially defined by the angles θ, λ, and α (46). For example, inclined channel 38f may define gabled roof 39f defined by angles θ, λ, and α based on EQUATION 1.

In some examples, the example technique of FIG. 5 may further include allowing gabled roof 39f of inclined channel 38f of component 36f to collapse to form arched roof 39g of post-collapse channel 38g of post-collapse component 36g (48). For example, controller 34 may control additive manufacturing tool 14 to pause for a sufficient duration of time to allow component 36f to collapse to form component 36g. In some examples, component 36f may include a plurality of channels, and controller 34 may pause additive manufacturing tool 14 after depositing material 20 defining each respective channel of the plurality of channels for a sufficient duration of time to allow each respective channel of the plurality of channels to collapse. In some examples, one or more channels of the plurality of channels may collapse within a same duration of time. In some examples, one or more channels of the plurality of channels may collapse within different or successive durations of time. In some examples, the pause time may depend on one or more factors such as the composition of material 20, the energy beam 30, the rate of the interaction between energy beam 30 and material 20, the rate at which material stream 26 deposits material 20, the geometry of channel 38f, the geometry of component 36f, or the weight of material deposited in component 36f over channel 38f. For example, the pause time may be increased when interaction between material 20 and energy beam 30 is slower, such that component 36f requires a longer time to solidify after deposition of material 20. In some examples, the pause time may be increased if the size of channel is relatively larger, such that gabled roof 39f may collapse over a longer time period. In some examples, the pause time may be shortened if the weight of material 20 deposited above channel 36f is higher, so that gabled roof 39f collapses relatively faster. In some examples, digital representation 16f may include a target arched roof.

Thus, systems and techniques describes above may be used to fabricate a component including an inclined channel that has a target arched roof, based on a digital representation of the inclined channel that includes a gabled roof configured to collapse into an arched roof substantially similar to the target arched roof.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

EXAMPLES

Example 1

Additively manufactured components defining channels were compared to digital representations of the components. FIG. 6A is a conceptual and schematic block diagram illustrating a digital representation of a circular cross-section of a horizontal channel. A horizontal channel 52b was additively manufactured by depositing a material 54 based on digital representation 52a of a channel having a substantially circular cross-section. Digital representation 52a includes an arched roof. FIG. 6B is a photograph illustrating a cross-section of the additively manufactured component defining horizontal channel 52b. After fabrication, horizontal channel 52b exhibited a collapsed or sagging roof 56.

FIG. 7A is a conceptual and schematic block diagram illustrating a digital representation of a teardrop cross-section of a horizontal channel. A horizontal channel 52d was additively manufactured by depositing material 54 based on digital representation 52c defining a gabled roof 58c. FIG. 7B is a photograph illustrating a cross-section of the additively manufactured component defining horizontal channel 52d. The component of FIG. 7B was fabricated using substantially the same additive manufacturing technique used for fabricating the component of FIG. 7A. Post-fabrication, horizontal channel 52d had an arched roof.

Example 2

EQUATION 1 was used to plot charts relating inclination angle α of an inclined channel to an angle θ defined by a gabled roof of the inclined channel in a plane normal to the longitudinal axis of the channel, based on a predetermined angle λ defined by a gabled roof of a horizontal channel configured to collapse to form an arched horizontal roof.

Figure 8A:
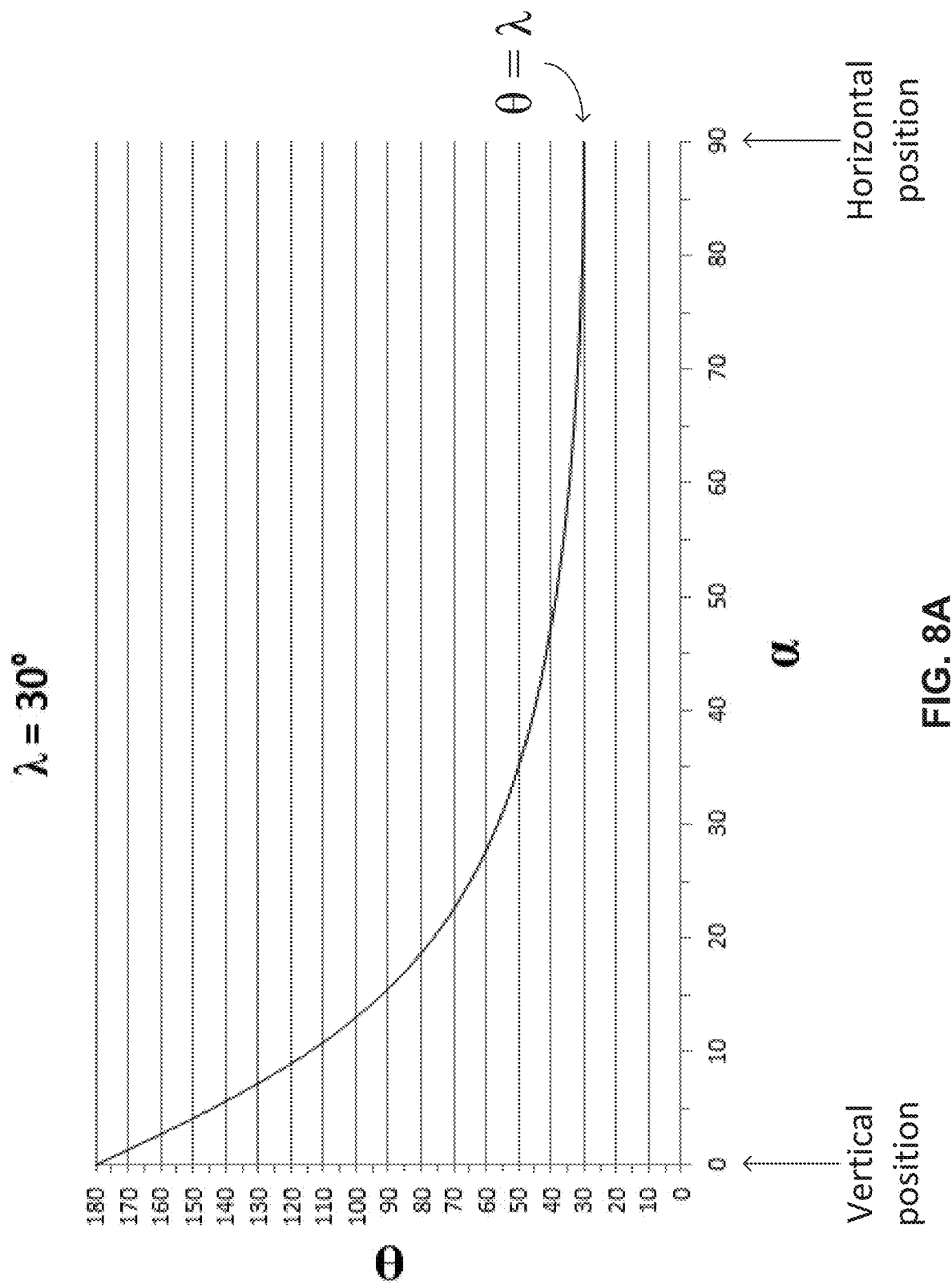
FIG. 8A is a chart illustrating a relationship between an inclination angle $\alpha$ of an inclined channel and the angle $\theta$ defined by a gabled roof of the inclined channel, when a predetermined angle $\lambda$ defined by a horizontal gabled roof equals 30°.

FIG. 8A is a chart illustrating a relationship between the inclination angle α of the inclined channel and the angle θ defined by the gabled roof of the inclined channel, when the predetermined angle λ defined by the horizontal gabled roof equals 30°.

FIG. 8B is a chart illustrating a relationship between the inclination angle α of the inclined channel and the angle θ defined by the gabled roof of the inclined channel, when the predetermined angle λ defined by the horizontal gabled roof equals 45°.

FIG. 8C is a chart illustrating a relationship between the inclination angle α of an inclined channel and the angle θ defined by the gabled roof of the inclined channel, when the predetermined angle λ defined by the horizontal gabled roof equals 60°.

As seen in FIGS. 8A-8C, the angle θ equals the respective angle λ when α=90°, corresponding to a completely horizontal inclination. The angle θ equals 180, indicating the lack of an angle or the necessity for gabled roof, when α=0°, corresponding to a completely vertical inclination, being independent of the value of respective angle λ.

Various examples have been described. These and other examples are within the scope of the following claims.

The invention claimed is:

1. A method comprising:
defining, by a computing device, a digital representation of an inclined channel at least partially within a component, including an angle θ, based on a formula $\theta=2\tan^{-1}[\tan(\lambda/2)/\sin(\alpha)]$, the angle λ, and the angle α, wherein the inclined channel defines a longitudinal axis inclined at the angle α relative to a build direction of the component, wherein the digital representation of the inclined channel includes a gabled roof configured to collapse into an arched roof, wherein the angle λ is a predetermined interior angle of the gabled roof measured in a plane substantially parallel to the build direction, and wherein the angle θ is an interior angle of the gabled roof in a plane substantially normal to the inclined longitudinal axis;
controlling, by the computing device, based on the digital representation, an additive manufacturing tool to deposit a material along the build direction to fabricate the component including the inclined channel having a geometry at least partially defined by the angles θ, λ, and α; and
heating or curing the component to collapse the gabled roof of the inclined channel to form the arched roof.

2. The method of claim 1, further comprising:
allowing the gabled roof of the inclined channel of the component to collapse to form the arched roof.

3. The method of claim 1, further comprising:
identifying, by the computing device, a target arched roof in the digital representation; and
modifying, by the computing device, the digital representation by replacing the target arched roof with the gabled roof, wherein the arched roof is substantially similar to the target arched roof.

4. The method of claim 3, further comprising:
determining, by the computing device, a target arc defined by the target arched roof in a plane substantially parallel to the build direction;
selecting, by the computing device, a candidate arc of a plurality of candidate arcs by matching the target arc with the plurality of candidate arcs based on a match between the candidate arc and the target arc, wherein each respective candidate arc of the plurality of candidate arcs is defined by a respective horizontal arched roof formed by collapse of a respective horizontal gabled roof having a respective candidate angle of a plurality of candidate angles; and
setting, by the computing device, the angle λ to the candidate angle associated with the selected candidate arc.

5. The method of claim 1, wherein the gabled roof and the inclined channel define a teardrop cross-section in a plane substantially normal to the inclined longitudinal axis.

6. The method of claim 1, wherein the arched roof and the inclined channel define a predetermined substantially circular or elliptical cross-section in the plane substantially normal to the inclined longitudinal axis.

7. The method of claim 1, wherein the arched roof defines an arc in a plane substantially parallel to the build direction that is substantially similar to a horizontal arc defined by a horizontal arched roof formed by collapse of a horizontal test channel having a horizontal gabled roof having the angle λ.

* * * * *